P. J. CONVERY.
Sewer-Trap Valve.
No. 204,135. Patented May 28, 1878.
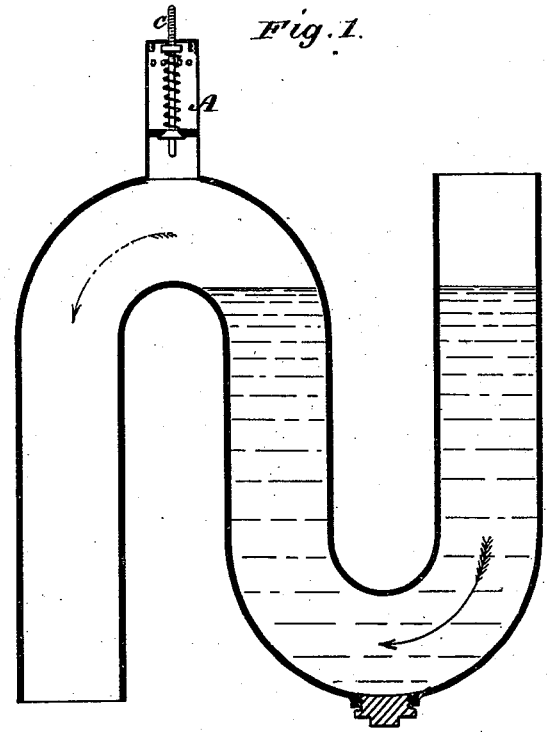
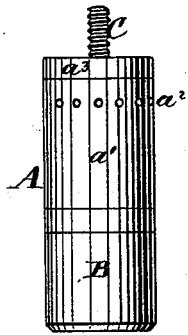
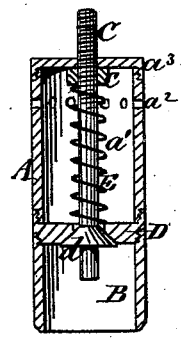
Witnesses:
C. E. Masson
J. J. Masson
Inventor:
Peter J. Convery
by Lewis Abraham
attorney.

UNITED STATES PATENT OFFICE.

PETER J. CONVERY, OF BROOKLYN, NEW YORK.

IMPROVEMENT IN SEWER-TRAP VALVES.

Specification forming part of Letters Patent No. 204,135, dated May 28, 1878; application filed April 13, 1878.

*To all whom it may concern:*

Be it known that I, PETER J. CONVERY, of Brooklyn, in the county of Kings and State of New York, have invented a new and useful Improvement in Valves for Sewer-Traps, which improvement is fully set forth in the following specification and accompanying drawing, in which—

Figure 1 is a vertical sectional view of a trap with my valve attached. Fig. 2 is a view of the valve inclosed in a cylinder. Fig. 3 is a longitudinal section thereof.

Appropriate letters designate the several parts.

The object of my invention is to provide a device to prevent the formation of a vacuum, and the consequent siphonage, in sewer-traps, and the escape of sewer-gas therefrom.

A is a cylinder, in which I inclose the several parts composing my valve. It is intended to be connected to the upper heel of a sewer-trap by means of the ferrule B, extending below the ground seat D, as shown in Fig. 3.

The valve consists of a threaded spindle, C, round which is wound a coiled spring, E, kept at proper tension by means of the nut $c$, and the air-tight ground seat D, closed with the tapering plug $d$, which is fastened to the lower end of the spindle C.

The cap $a^3$ of the cylinder A is pierced with a central slot, through which the upper end of the spindle C plays loosely. The cylinder A, near the top of the section $a^1$, is pierced with vent-holes $a^2$. The coiled spring is purposely weak, so as to be readily overcome with slight suctional force.

When there is a tendency to siphonage in the trap, the spindle will be drawn down, removing the plug from the ground seat, the siphonage and flow of gas will be arrested, and the water-line in the trap restored to its proper level.

What I claim as my invention is—

A valve for sewer-traps, consisting of the threaded spindle C, the coiled spring E, the regulating-nut $c$, in combination with the air-tight ground seat D, inclosed in the sectional cylinder A, supplied with vent-holes $a^2$, substantially as described, for the purpose intended.

PETER J. CONVERY.

Witnesses:
EDWD. J. O'REILLY,
JAMES CLYNE.